United States Patent
Uehara

(10) Patent No.: US 9,969,631 B2
(45) Date of Patent: May 15, 2018

(54) DECOMPOSER CONTAINING IRON PARTICLES FOR ORGANOHALOGEN COMPOUND AND METHOD FOR PRODUCING THE SAME

(75) Inventor: Taishi Uehara, Chiyoda-ku (JP)

(73) Assignee: DOWA ECO-SYSTEM CO., LTD., Chiyoda-Ku, Tokyo (JP)

(*) Notice: Subject to any disclaimer, the term of this patent is extended or adjusted under 35 U.S.C. 154(b) by 334 days.

(21) Appl. No.: 13/825,647

(22) PCT Filed: Sep. 14, 2011

(86) PCT No.: PCT/JP2011/070987
§ 371 (c)(1),
(2), (4) Date: Mar. 22, 2013

(87) PCT Pub. No.: WO2012/039334
PCT Pub. Date: Mar. 29, 2012

(65) Prior Publication Data
US 2013/0175468 A1    Jul. 11, 2013

(30) Foreign Application Priority Data

Sep. 24, 2010 (JP) .................... 2010-213290

(51) Int. Cl.
*C02F 1/58* (2006.01)
*B01D 53/70* (2006.01)
(Continued)

(52) U.S. Cl.
CPC .......... *C02F 1/58* (2013.01); *A62D 3/34* (2013.01); *B01D 53/70* (2013.01); *B01J 23/745* (2013.01);
(Continued)

(58) Field of Classification Search
CPC ...... C02F 1/58; C02F 1/725; C02F 2101/366; C02F 2103/06; C02F 2101/363;
(Continued)

(56) References Cited

U.S. PATENT DOCUMENTS 5,954,854 A * 9/1999 Inoshita et al. ............. 75/10.12
2002/0169244 A1 * 11/2002 Ostertag ............... B22F 1/0007
524/440

(Continued)

FOREIGN PATENT DOCUMENTS

EP    1661864 A1    5/2006
JP    11-235577 A   8/1999
(Continued)

OTHER PUBLICATIONS

European Extended Search Report, Supplementary European Search Report and European Search Opinion of corresponding European Application No. 11826780, dated Jul. 3, 2014.(12 pages).

(Continued)

*Primary Examiner* — Peter F Godenschwager
*Assistant Examiner* — Andrew J. Oyer
(74) *Attorney, Agent, or Firm* — Buchanan, Ingersoll & Rooney PC

(57) ABSTRACT

A decomposer for an organohalogen compound, containing iron particles comprising iron and iron oxide, wherein the iron particles have a metallic iron content of 15% or more by mass, wherein the metallic iron content is a content of metallic iron in the outermost surface layer of the iron particles to which the ion beam etching has been applied twice under the following etching conditions:
degree of vacuum in a chamber: $2.0 \times 10^{-2}$ Pa
accelerating voltage of an ion gun: 10 kV
emission current: 10 mA
etching time: 14 seconds.

(Continued)

The decomposer need not contain copper and has the ability to satisfactorily decompose an organohalogen compound. A method for producing the decomposer is also provided.

6 Claims, 1 Drawing Sheet

(51) Int. Cl.
*B01J 37/34* (2006.01)
*B01J 35/00* (2006.01)
*B01J 23/745* (2006.01)
*A62D 3/34* (2007.01)
*B22F 1/00* (2006.01)
*B22F 9/04* (2006.01)
*C09K 17/02* (2006.01)
*B09C 1/08* (2006.01)
*C02F 1/72* (2006.01)
*B09C 1/00* (2006.01)
*C02F 101/36* (2006.01)
*B22F 1/02* (2006.01)
*A62D 101/22* (2007.01)
*C02F 103/06* (2006.01)
*B01J 37/00* (2006.01)
*B01J 37/06* (2006.01)
*B01J 35/02* (2006.01)
*B01J 35/10* (2006.01)

(52) U.S. Cl.
CPC ......... *B01J 35/002* (2013.01); *B01J 35/0073* (2013.01); *B01J 37/347* (2013.01); *B09C 1/002* (2013.01); *B09C 1/08* (2013.01); *B22F 1/0055* (2013.01); *B22F 1/0081* (2013.01); *B22F 9/04* (2013.01); *C02F 1/725* (2013.01); *C09K 17/02* (2013.01); *A62D 2101/22* (2013.01); *B01D 2253/1122* (2013.01); *B01D 2253/1124* (2013.01); *B01D 2253/304* (2013.01); *B01D 2253/306* (2013.01); *B01D 2255/20738* (2013.01); *B01D 2257/2064* (2013.01); *B01D 2257/2066* (2013.01); *B01D 2258/00* (2013.01); *B01J 35/008* (2013.01); *B01J 35/0026* (2013.01); *B01J 35/023* (2013.01); *B01J 35/1009* (2013.01); *B01J 37/0036* (2013.01); *B01J 37/06* (2013.01); *B22F 1/02* (2013.01); *B22F 2009/043* (2013.01); *B22F 2301/35* (2013.01); *B22F 2999/00* (2013.01); *C02F 2101/36* (2013.01); *C02F 2101/363* (2013.01); *C02F 2101/366* (2013.01); *C02F 2103/06* (2013.01)

(58) Field of Classification Search
CPC ..... C02F 2101/36; C09K 17/02; B01D 53/70; B01D 2255/20738; B01D 2258/00; B01D 2253/304; B01D 2253/306; B01D 2257/2064; B01D 2257/2066; B01D 2253/1124; B01D 2253/1122; B01J 37/347; B01J 35/002; B01J 35/0073; B01J 23/745; B01J 35/0026; B01J 35/008; B01J 37/06; B01J 35/023; B01J 35/1009; B01J 37/0036; A62D 3/34; A62D 2101/22; B22F 1/0055; B22F 9/04; B22F 1/0081; B22F 2999/00; B22F 2009/043; B22F 2301/35; B22F 1/02; B09C 1/08; B09C 1/002
See application file for complete search history.

(56) References Cited

U.S. PATENT DOCUMENTS

| | | |
|---|---|---|
| 2005/0199556 A1 | 9/2005 | Zhang |
| 2006/0113255 A1 | 6/2006 | Kakuya et al. |
| 2008/0156741 A1* | 7/2008 | Kakuya et al. ............... 210/757 |
| 2008/0175740 A1* | 7/2008 | Ruthner ................ C01G 49/02 419/63 |
| 2009/0054229 A1 | 2/2009 | Kamada et al. |
| 2010/0224822 A1* | 9/2010 | Vachon .................... B22F 1/02 252/62.55 |
| 2013/0140250 A1 | 6/2013 | Gore et al. |

FOREIGN PATENT DOCUMENTS

| | | |
|---|---|---|
| JP | 2000-005740 A | 1/2000 |
| JP | 2002-248458 A | 9/2002 |
| JP | 2005-007269 A | 1/2005 |
| JP | 2007-009179 A | 1/2007 |
| JP | 2007-229669 A | 9/2007 |
| WO | WO 2012/007550 A1 | 1/2012 |

OTHER PUBLICATIONS

International Search Report (PCT/ISA/210) dated Dec. 6, 2011, by the Japanese Patent Office as the International Searching Authority for International Application No. PCT/JP2011/070987.
Written Opinion (PCT/ISA/237) dated Dec. 6, 2011, by the Japanese Patent Office as the International Searching Authority for International Application No. PCT/JP2011/070987.
Notification of Transmittal of Translation of the International Preliminary Report on Patentability (Chapter I or Chapter II)(PCT/IB/338) and International Preliminary Report on Patentability (Form PCT/IB/373), Written Opinion of the International Searching Authority (Translation), dated Apr. 25, 2013, in corresponding International Application No. PCT/JP2011/070987. (6 pages).

* cited by examiner

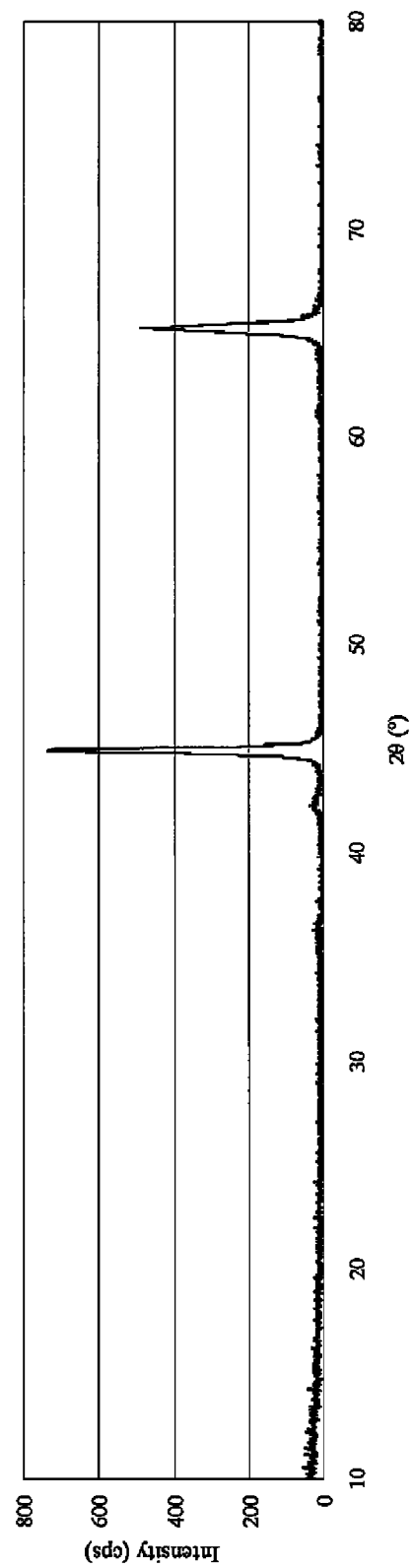

DECOMPOSER CONTAINING IRON PARTICLES FOR ORGANOHALOGEN COMPOUND AND METHOD FOR PRODUCING THE SAME

FIELD OF THE INVENTION

The present invention relates to a decomposer containing iron particles for an organohalogen compound, and more particularly to a decomposer for an organohalogen compound, containing iron particles which comprise iron and iron oxide and have a specific surface composition. The present invention also relates to a method for producing the same.

BACKGROUND ART

Conventionally, as a method for cleaning soils and groundwater contaminated with organohalogen compounds, such as trichloroethylene, there has been proposed a treatment method using iron powder having an increased specific surface area as a decomposer to make it possible to change the contaminated soils and groundwater to be harmless at a relatively low cost and in a relatively short term (refer to Patent document 1). Further, there has been developed and used a technique of using iron powder containing copper as a decomposer for improving the performance for decomposing an organohalogen compound (refer to Patent document 2).

PRIOR ART REFERENCES

Patent documents

Patent document 1: Japanese Unexamined Patent Publication No. Hei 11-235577
Patent document 2: Japanese Unexamined Patent Publication No. 2000-5740

SUMMARY OF THE INVENTION

Problems to be Solved by the Invention

However, sufficient performance for decomposing an organohalogen compound cannot be obtained by the technique of increasing the specific surface area of iron powder as described in Patent document 1. There is also a risk that the copper contained in the iron powder is dissolved out during the process by the technique of using the copper-containing iron powder as described in Patent document 2, while the performance for decomposing an organohalogen compound is improved. Further, from the viewpoint of a cost for producing the copper-containing iron powder, it is desired to obtain a decomposer capable of efficiently decomposing an organohalogen compound without containing copper.

In this situation, as a method for increasing the specific surface area of a decomposer, the present inventor attempted to flatten the decomposer. However, the effect of improving the decomposing ability was not sufficient.

In view of the above-mentioned problems of the prior arts, the present invention has been made, and an object of the present invention is to provide a decomposer comprising iron particles which need not contain copper, and having the ability to satisfactorily decompose an organohalogen compound, and to provide a method for producing the same.

Means to Solve the Problems

The present inventor has conducted extensive and intensive studies with a view toward solving the above-mentioned problems, and thought about factors affecting the decomposing ability of iron powder other than the specific surface area of the decomposer. As a result, it has been newly found that as oxidation proceeds on the surface of iron powder, the decomposing ability of the iron powder becomes lower, and therefore the present invention has been completed.

The first aspect of the present invention is a decomposer for an organohalogen compound, containing iron particles comprising iron and iron oxide, wherein the iron particles have a value of 15% or more by mass as a metallic iron content in the outermost surface layer of the iron particles to which ion beam etching has been applied twice under the following etching conditions:
degree of vacuum in a chamber: $2.0 \times 10^{-2}$ Pa
accelerating voltage of an ion gun: 10 kV
emission current: 10 mA
etching time: 14 seconds.

The second aspect of the present invention is a method for producing the above-mentioned decomposer for an organohalogen compound, wherein the method comprises the steps of: subjecting iron powder to wet treatment in a pot of a ball mill containing a liquid medium; washing the wet treated iron powder with an aqueous solvent; and drying the washed iron powder at a temperature of 30° C. or lower to obtain iron particles.

Effect of the Invention

The decomposer of the present invention for an organohalogen compound has an effect such that the performance for decomposing an organohalogen compound is improved without containing copper or the like.

BRIEF DESCRIPTION OF THE DRAWING

FIG. 1 is a diagram showing an example of a spectrum obtained as the result of an XRD analysis with respect to the decomposer for an organohalogen compound.

EMBODIMENT OF THE INVENTION

The decomposer of the present invention for an organohalogen compound contains iron particles comprising iron and iron oxide, wherein the iron particles have a value of 15 to 20% by mass as a metallic iron content in the outermost surface layer of the iron particles to which ion beam etching has been applied twice under the following etching conditions:
degree of vacuum in a chamber: $2.0 \times 10^{-2}$ Pa
accelerating voltage of an ion gun: 10 kV
emission current: 10 mA
etching time: 14 seconds.

Specifically, the iron particles in the present invention (1) comprise metallic iron and iron oxide as constituent elements, and (2) have a metallic iron content of 15% or more by mass in the outermost surface layer of the iron particles to which ion beam etching has been applied twice.

((1) Constituent Elements of the Iron Particles)

The iron particles essentially comprise iron (i.e., metallic iron) and iron oxide. The iron oxide includes iron(II) oxide (FeO), iron(III) oxide ($Fe_2O_3$), and triiron tetraoxide ($Fe_3O_4$). The iron particles comprise metallic iron in a relatively large amount and iron oxide in a relatively small amount.

(BET Specific Surface Area of the Iron Particles)

The iron particles preferably have a BET specific surface area of 1.0 $m^2$/g or more, more preferably 1.5 $m^2$/g or more.

The BET specific surface area value is measured by the method described below. After performing the vacuum deaeration for removing the affection of gas adsorbed in the surface of the sample for measurement (iron particles), a nitrogen gas adsorption isotherm of the iron particles is measured at the liquid nitrogen temperature (−196° C.) under a stream of mixed gas of nitrogen and helium as a carrier gas. A BET specific surface area is determined by applying a BET infinite layer adsorption equation to the obtained adsorption isotherm. The BET infinite layer adsorption equation is represented by the following formula.

$$(x/v)(1-x) = (1/v_mC) + \{(C-1)/v_mC\}x$$

In the above formula, x: relative pressure=$P/P_0$, P: equilibrium pressure, $P_0$: saturated vapor pressure, v: equilibrium adsorption amount [ml·STP/g], $v_m$: monomolecular adsorption amount [ml·STP/g], C: constant=$\text{Exp}\{(E_1-E_L)/RT\}$, $E_1$: heat of adsorption onto the first layer, $E_L$: heat of liquefaction, R: gas constant, and T: absolute temperature. $v_m$ is obtained by plotting x/v(1−x) and x from actual measurements, and thus a surface area is determined from the following formula.

$$S = \sigma_m(v_m/22,400)(6.02 \times 10^{23})(10^{-20})[m^2/g]$$

Wherein $\sigma_m$ is an area occupied by one adsorbing molecule and 16.2 $Å^2$ is used.
(Source): "Biryushi Hando Bukku (Fine Particle Handbook)"/Motoji Jinbo et. al./Asakura Publishing Co., Ltd. (p. 152)

In the actual measurement, surface area data is obtained as the results of the above-mentioned calculations made within the apparatus (MONOSORB, manufactured by Yuasa-Ionics Co., Ltd.) used in the measurement. Further, with respect to an error caused due to the environment of the measurement, correction is made using the result of the measurement with respect to an aluminum oxide standard powder sample having a known specific surface area.

((2) Content of Metallic Iron in the Surface Layer of the Iron Particles after the Ion Beam Etching has been Applied)

The content of metallic iron in the surface of the iron particles and ion beam etching are evaluated by the methods described below.

As an apparatus, an XPS (X-ray photoelectron spectroscopy) apparatus ESCA-3400, manufactured by Kratos Analytical Ltd., was used. A sample for analysis, which was fixed to a sample holder for analysis using a carbon tape, was set in a vacuum chamber of the apparatus, and subjected to analysis and ion beam etching under specific etching conditions. XPS is a method and apparatus for evaluation in which the surface of a sample is irradiated with an X-ray generated from an X-ray source to measure distribution of the energy of electrons coming out from the surface of the sample. The apparatus used in the embodiment had a structure in which a sample is irradiated with an X-ray entering at an angle of 20° to the plane of the sample holder having the sample fixed thereto and photoelectrons are detected by a detector positioned in the direction perpendicular to the plane of the sample holder. The generated electrons are excited by a light, such as an X-ray, and therefore they are so called photoelectrons. The photoelectrons have an inherent bond energy according to elements present in the surface of a sample and its oxidation state, and therefore, a composition of the elements present in the sample surface and their oxidation states can be known from the distribution of such energy. The kinetic energy of photoelectrons is so small that the photoelectrons generated in a deep portion lose their energy before reaching the surface, and thus only information of the area to be shallower than a depth of about several nm from the surface is obtained. Therefore, XPS is considered to be an analytical apparatus suitable for analyzing the outermost surface of a sample in respect of the organohalogen compound decomposition reaction.

The energy values inherent in elements and forms of compounds are described in, for example, a reference document "Handbook of X-ray Photoelectron Spectroscopy, N. Ikeo, Y. Iijima, N. Nimura, M. Sigematsu, T. Tazawa, S. Matsumoto, K. Kojima, and Y. Nagasawa, JEOL (1991)", and further, a software for analyzing from the energy distribution data obtained in an XPS apparatus can be used. In the present invention, from an intensity of a peak of the electron on $2P_{3/2}$ orbital of metallic iron appearing at a bond energy of 707 eV and an intensity of a peak of the oxide of iron appearing at a bond energy of 711 eV, analysis was performed according to the ratio between the integrated values of the peak areas by using data processing software "Vision 2" for Kratos ESCA-3400. When DKP-100, manufactured by DOWA IP CREATION CO., LTD., was used as a raw material iron powder as used in the experiment in the present invention, wherein the raw material is iron powder having a small impurity content, an analysis was made on the assumption that the raw material iron powder includes only iron and oxygen without taking trace elements into consideration. That is, when the iron content is taken as $C_1$ and the iron oxide content is taken as $C_2$, the relationship: $C_1+C_2=1$ is satisfied.

The surface layer of the iron particles to which the ion beam etching has been applied twice under specific etching conditions contains metallic iron in an amount of 15% or more by mass. The remainder (less than 85% by mass) of the iron particles is essentially iron oxide. The above surface layer of the iron particles preferably contains metallic iron in an amount of 15 to 20% by mass.

The specific etching conditions are as follows:
degree of vacuum in a chamber: $2.0 \times 10^{-2}$ Pa
accelerating voltage of an ion gun: 10 kV
emission current: 10 mA
etching time: 14 seconds.

The above-mentioned etching conditions are conditions such that when, for example, the ion beam etching is applied to silicon dioxide under the above conditions, about 64 nm can be etched per one time of the etching.

The ion beam etching is performed as follows. While keeping constant the degree of vacuum in the vacuum chamber of an XPS apparatus, Ar gas is gradually introduced into the chamber and continuously ionized, and the resultant Ar ions are accelerated by an accelerator and caused to collide with the surface of a sample. The amount of the Ar ions which collide with the surface of the sample is controlled by appropriately selecting the degree of vacuum (Ar gas concentration), the accelerating voltage of an ion gun, and the emission current, and etching is made for a predetermined period of time, and thereby the amount of the etched material in the surface of the sample can be controlled.

Further, in the iron particles in the present invention, the content of metallic iron in the surface layer of the iron particles to which iron etching has been applied four times under the above-mentioned etching conditions is preferably 20% or more by mass, further preferably 20 to 40% by mass, especially preferably 35 to 40% by mass.

Further, in the iron particles in the present invention, the content of metallic iron in the surface layer of the iron particles to which iron etching has been applied once under the above-mentioned etching conditions is preferably 10% or more by mass, further preferably 10 to 15% by mass.

Further, in the iron particles in the present invention, the content of metallic iron in the surface layer of the iron particles to which iron etching has been applied three times under the above-mentioned etching conditions is preferably 25% or more by mass, further preferably 25 to 30% by mass.

The iron particles in the present invention preferably have a peak intensity ratio ($I_2/I_1$) of 0.2 or more in the powder X-ray diffraction (hereinafter, referred to as "XRD") pattern wherein $I_1$ is an intensity of the peak for (110) plane and $I_2$ is an intensity of the peak for (200) plane. The peak intensity ratio ($I_2/I_1$) is more preferably 0.3 or more, especially preferably 0.5 or more.

With respect to the relationship between the peak intensity ratio ($I_2/I_1$) of the two crystal planes and the decomposition effect for an organohalogen compound, complete elucidation has not yet been made, but the relationship is presumed as follows. Specifically, it is presumed that (200) plane has excellent function effective as a site having a decomposition effect for an organohalogen compound, as compared to (110) plane, and (200) plane is present in a large amount in the surface of the particles obtained by the method for producing a decomposer for an organohalogen compound and the conditions thereof shown in the present invention. It is considered that, by virtue of a combination of the peak intensity ratio of 0.2 or more, which causes (200) crystal plane to be appropriately present in the surface of the particles, and the above-mentioned oxidation state, a material having excellent decomposition effect for an organohalogen compound can be obtained without adding thereto an additive, such as copper.

The peak intensity ratio ($I_2/I_1$) is measured by the method described below. An example of a spectrum obtained as the result of a powder XRD analysis with respect to the decomposer of the present invention for an organohalogen compound is shown in FIG. 1. Characteristic large peaks appearing at $2\theta=44.9°$ and $65.2°$ can be recognized in FIG. 1. By applying the data of $2\theta$ angles of these peaks and the XRD measurement conditions to Bragg's law, a lattice spacing of the crystal is determined, and, from this, it is found that these peaks are characteristic of (110) plane and (200) plane, respectively. From the intensities of the peaks for (110) plane and (200) plane, a peak intensity ratio ($I_2/I_1$) can be determined.

The iron particles in the present invention preferably have a bulk density of 2.0 g/cm$^3$ or less. The bulk density is more preferably 1.0 g/cm$^3$ or less.

The bulk density is measured by the method described below. From a funnel-form container fixed at a certain height, a powder to be measured, which has been passed through a sieve so that the primary particles of the powder are satisfactorily dispersed, is allowed to fall into a cylinder placed in a bulk density measurement apparatus (as an example of the apparatus, there can be mentioned "model MVD-86", manufactured by Tsutsui Scientific Instruments Co., Ltd.). The cylinder is filled with the powder at a level of the top end of the cylinder, and a mass of the powder filling the cylinder is measured. A bulk density can be determined by dividing the mass of the powder by the internal volume of the cylinder.

With respect to the shape of the iron particles in the present invention, there is no particular limitation, and the iron particles can be in any shape, such as a spherical shape, a prism shape, a Rugby ball shape, or a flattened shape. The shape of the iron particles is preferably a flattened shape because the iron particles in a flattened shape can be easily obtained by a process (for example, a wet ball mill treatment method shown in the Example of the present invention) which easily increases the specific surface area of powder, and the number of active sites having an organohalogen compound decomposing function per particle volume. The iron particles having the other shapes mentioned above can be prepared by appropriately controlling the conditions for various methods, such as a wet synthesis method, an atomization method, a CVD method, a PDV method, and a pulverization method. When the iron particles are in a flattened shape, the flattened particles preferably have a plate ratio of 2 or more, further preferably 3 or more, especially preferably 5 or more. The flattened particles preferably have an average diameter of 100 μm or more, further preferably 120 μm or more.

The average diameter and plate ratio of the flattened particles are determined from the following formulae.

Average diameter of the flattened particles=(2×Average plane diameter+Average thickness)/3

Plate ratio of the flattened particles=Average plane diameter/Average thickness

The average plane diameter is determined by measuring the long diameter in the direction of the flattened plane of the particle and the short diameter to be perpendicular to the long diameter with respect to 50 particles, then figuring out Plane diameter by the calculation such as Plane diameter= (Long diameter+Short diameter)/2, and averaging the calculated Plane diameters. The average thickness is determined from an average of thickness values measured with respect to 50 particles.

The decomposer of the present invention is a decomposer for an organohalogen compound. A halogen in the organohalogen compound is chlorine, fluorine, bromine, and iodine, especially advantageously chlorine and fluorine. Examples of organohalogen compounds include dichloromethane, carbon tetrachloride, 1,2-dichloroethane, 1,1-dichloroethane, 1,1,1-trichloroethane, 1,1,2-trichloroethane, trichloroethylene, tetrachloroethylene, 1,3-dichloropropene, trihalomethane, PCB, and dioxin.

By applying the decomposer of the present invention to soils, groundwater, waste water, and exhaust gas contaminated with organohalogen compounds, it is possible to clean them. The cleaning of contaminated soils, groundwater, or the like can be performed by a conventionally known method, such as a method in which the decomposer is added and mixed into contaminated soils, or a method in which contaminated groundwater is passed through a layer of the decomposer.

The present invention is also directed to a method for producing the above-described decomposer for an organohalogen compound. The method of the present invention for producing the decomposer comprises the steps of: (1) subjecting iron powder as a raw material to wet treatment in a pot of a ball mill containing a liquid medium, (2) washing the wet treated iron powder with an aqueous solvent, and (3) drying the washed iron powder at a temperature of 30° C. or lower to obtain iron particles.

Step (1) in the present invention is a ball mill treatment step in which iron powder is filled into a pot containing a liquid medium and a medium for applying an impact to the iron powder and the pot is driven to, e.g., rotate or vibrate so that the iron powder contained in the pot is subjected to wet treatment.

In step (1), as the liquid medium, e.g., water, an alcohol, or another organic solvent can be used. Preferred liquid solvents are water, methanol, ethanol, and isopropyl alcohol (IPA). The liquid medium is used in such an amount that the iron powder in the pot is not in contact with air.

In step (1), as the pot, a commercially available pot can be used, and examples include pots made of steel, stainless steel or magnetic material. As an example of the driving method, there can be mentioned a pot mill, model PTA-01, manufactured by NIDEC-SHIMPO CORPORATION.

In step (1), examples of the media for applying an impact to the iron powder include balls made of zirconium oxide, aluminum oxide, iron, steel, stainless steel, agate, or magnetic material.

In step (1), as the raw material iron powder, a commercially available iron powder can be used. Examples of commercially available iron powders include reduced iron powder (e.g., DKP-100, manufactured by DOWA IP CREATION CO., LTD.), electrolytic iron powder, atomized iron powder, carbonyl iron powder, and cut pieces of iron material.

In step (1), the wet treatment means a treatment for mechanically mixing and deforming the raw material iron powder using the action of the balls in a pot in the presence of a liquid medium (without continuously flowing air or contacting air with the iron powder for preventing the iron powder from suffering excess oxidation). The wet treatment modifies the raw material iron powder in, e.g., shape.

The conditions for the treatment in step (1) are appropriately selected, such that, as exemplified; the temperature is 25° C., the processing period is 20 hours, and the number of revolutions is 120 rpm (which corresponds to a circumferential speed of 60 m/min for the pot having an outer diameter of 500 mm, which is used in the embodiment).

Step (2) in the present invention is a step for washing with an aqueous solvent the wet treated iron powder which is, if necessary, separated from the liquid medium.

In step (2), the aqueous solvent can be water, a water-soluble organic solvent, or a mixture thereof. Examples of water-soluble organic solvents include an alcohol, benzene, toluene, ethylbenzene, xylene, ether or the like.

Step (2) is performed for satisfactorily removing the liquid medium from the iron powder, and, with respect to the method for washing, there is no particular limitation, but a washing apparatus having a filtration and pressing function, such as a filter press or a Nutsche, is advantageously used. In step (2), the amount of the aqueous solvent used is appropriately selected, but the aqueous solvent in an amount of 5 to 200% by mass, based on the mass of the iron powder, is used once or several times. The temperature in step (2) varies depending on the used aqueous solvent, but a temperature around room temperature is preferred from the viewpoint of the production cost.

Step (3) in the present invention is a step for drying the washed iron powder at a temperature of 30° C. or lower to obtain iron particles. This step modifies the iron powder in, e.g., the surface composition. When the drying temperature is higher than 30° C., the activity of the decomposer is reduced. The temperature in step (3) is preferably 20° C. or lower, more preferably 15° C. or lower.

The iron particles obtained by the method of the present invention can be used as a decomposer for themselves, or can be mixed with another material (e.g., a conventional iron powder) to form a decomposer.

(Decomposition Test for an Organohalogen Compound)

The performance for decomposing an organohalogen compound was measured by the method described below.

50 mL of ion-exchanged water was placed in a 100 mL vial (actual capacity: 124 mL), and 0.5 g of a decomposer sample to be evaluated was placed in the vial. Using a Pasteur pipette, the sample was exposed to nitrogen gas from the bottom of the vial, and the vial was sealed up using a Teflon (registered trademark) coated butyl rubber septum and an aluminum cap. Using a microsyringe, trichloroethylene (TCE) as an organohalogen compound and benzene as an internal standard substance were injected into the vial through the septum portion, and the vial was subjected to shaking, and 100 μl, of gas was sampled from the head space of the vial every predetermined time and the gas was subjected to qualitative and quantitative analysis by means of a GC-MS (gas chromatography mass spectrometer) apparatus. The pressure in the vial changes due to the generation of gas from the iron powder or the like, but benzene as an internal standard substance suffers no change in the concentration due to the iron powder, and therefore, by measuring a benzene concentration at the same time, correction of the concentration can be made. From the attenuation tendency of the concentration of the organohalogen compound in the gas in the head space with respect to the test time (shaking treatment time), a decomposition rate of the organohalogen compound to be treated was evaluated.

EXAMPLES

Hereinafter, the present invention will be described with reference to the following Examples, which should not be construed as limiting the scope of the present invention.

Example 1

6,580 g of zirconium oxide balls having a diameter of 10 mm were placed in a stainless pot having a volume of 2.3 L. The amount of the balls charged was 80% by volume, based on the volume of the pot. Then, 100 g of reduced iron powder (DKP-100, manufactured by DOWA IP CREATION CO., LTD.) as a raw material iron powder and 1 L of pure water were charged into the ball mill The pot with the materials charged therein was rotated using a pot mill, model PTA-01, manufactured by NIDEC-SHIMPO CORPORATION, under conditions such that the temperature was 25° C. and the number of revolutions was 120 rpm (circumferential speed: 60 m/min.) for 20 hours to perform a wet treatment. The wet treated iron powder was separated from the water and zirconium oxide balls, and washed once using 100 mL of ethanol at a temperature of 25° C. The washed wet-treated iron powder was dried at a temperature of 10° C. for 24 hours to obtain iron particles in the present invention.

Example 2

Iron particles were obtained in substantially the same manner as in Example 1 except that, instead of ethanol, water was used in washing.

Comparative Example 1

Any of the steps for wet treatment, washing, and drying in Example 1 were not performed. That is, the raw material reduced iron powder was used as iron particles.

Comparative Example 2

Iron particles were obtained in substantially the same manner as in Example 1 except that the drying temperature was changed from 10° C. to 105° C.

Comparative Example 3

Iron particles were obtained in substantially the same manner as in Example 2 except that the drying temperature was changed from 10° C. to 105° C.

Comparative Example 4

100 g of reduced iron powder (DKP-100) as a raw material iron powder was put into a ball mill charged with the balls used in Example 1. The pot with the material charged therein was rotated using a pot mill, model PTA-01, manufactured by NIDEC-SHIMPO CORPORATION, under conditions such that the temperature was 25° C. and the number of revolutions was 120 rpm (circumferential speed: 60 m/min.) for 20 hours to perform a dry treatment, obtaining iron particles.

Test Example 1

With respect to the decomposers each comprising the iron particles in Examples 1 and 2 and Comparative Examples 1 to 4, the performance for decomposing an organohalogen compound was measured by the above-described method.

When an organohalogen compound decomposition reaction of the iron powder is assumed to be a first-order reaction, the decomposition reaction can be represented by the following formula 1.

$$C = C_0 \times e^{-k \times t}$$ [Mathematical formula 1]

$C_0$: Initial concentration of the organohalogen compound
$C$: Organohalogen compound concentration at a reaction time t
t: Reaction time [day]
k: Apparent reaction rate constant [day$^{-1}$]

The results (reaction rate constant k in the above formula) of the decomposition test using the decomposer with respect to trichloroethylene (TC) as an organohalogen compound are shown in Table 1.

TABLE 1

| Decomposer (Iron particles) | Organohalogen compound decomposition reaction constant k [day$^{-1}$] |
|---|---|
| Example 1 | 0.137 |
| Example 2 | 0.093 |
| Comparative example 1 | 0.000 |
| Comparative example 2 | 0.015 |
| Comparative example 3 | 0.008 |
| Comparative example 4 | 0.004 |

Test Example 2

With respect to the iron particles in Examples 1 and 2 and Comparative Examples 1 to 4, a content of metallic iron in the surface layer of the iron particles to which the ion beam etching had been applied 0 to 5 times was measured by the above-mentioned method. Further, with respect to the iron particles in Examples 1 and 2 and Comparative Examples 1 to 4, a plate ratio was measured by the above-mentioned method. The results of the measurement are shown in Table 2.

TABLE 2

| Iron particles | Number of etching (n) and metallic iron content (% by mass) | | | | | | Plate ratio |
|---|---|---|---|---|---|---|---|
| | 0 | 1 | 2 | 3 | 4 | 5 | |
| Example 1 | 2.9 | 11.7 | 18.4 | 29.6 | 37.6 | 37.0 | 35.1 |
| Example 2 | 0.0 | 8.6 | 17.0 | 17.2 | 20.0 | 24.2 | 33.4 |
| Comparative example 1 | 1.8 | 9.2 | 11.8 | 15.6 | 17.9 | 20.2 | 1.42 |
| Comparative example 2 | 0.9 | 3.1 | 14.5 | 14.9 | 20.0 | 20.9 | 31.8 |
| Comparative example 3 | 0.0 | 3.6 | 3.7 | 4.1 | 8.8 | 11.3 | 29.1 |
| Comparative example 4 | 2.3 | 9.6 | 11.9 | 12.6 | 16.0 | 17.0 | 1.06 |

Test Example 3

With respect to the iron particles in Examples 1 and 2 and Comparative Examples 1 and 4, a peak intensity ratio and a bulk density were measured by the above-mentioned methods. The results of the measurement are shown in Table 3.

TABLE 3

| Iron particles | Peak intensity ratio ($I_2/I_1$) | Bulk density (g/cm$^3$) |
|---|---|---|
| Example 1 | 0.77 | 0.74 |
| Example 2 | 0.66 | 0.58 |
| Comparative example 1 | 0.14 | 2.65 |
| Comparative example 4 | 0.24 | 2.09 |

INDUSTRIAL APPLICABILITY

The decomposer of the present invention for an organohalogen compound is improved in the performance of decomposing an organohalogen compound without containing a contaminant, such as copper, and therefore can be effectively used for cleaning soils, groundwater, and others contaminated with an organohalogen compound.

The invention claimed is:

1. A method for producing a decomposer for an organohalogen compound, the decomposer containing
   iron particles consisting of iron and iron oxide, wherein the iron particles have a value of 15% or more by mass as a metallic iron content in the outermost surface layer of the iron particles when ion beam etching has been applied to the iron particles twice under the following etching conditions:
   degree of vacuum in a chamber: 2.0×10$^{-2}$ Pa
   accelerating voltage of an ion gun: 10 kV
   emission current: 10 mA
   etching time: 14 seconds,
   wherein the iron particles have a peak intensity ratio ($I_2/I_1$) of 0.2 or more in the XRD pattern wherein $I_1$ is an intensity of the peak for (110) plane and $I_2$ is an intensity of the peak for (200) plane,
   wherein the content of the metallic iron in the surface layer of the iron particles when ion etching has been applied four times under said etching conditions is 35% or more by mass, wherein the content of metallic iron in the surface layer of the iron particles when ion etching has been applied once under said etching conditions is 10% or more by mass, wherein the content of metallic iron in the surface layer of the iron particles when ion etching has been applied three times under said etching conditions is 25% or more by mass, wherein the iron particles have a bulk density of 2.0 g/cm$^3$ or less, wherein the iron particles are in a flattened shape having a plate ratio of 5 or more, and wherein the iron particles have average diameter of 100 μm or more, the method comprising the steps of: subjecting raw material iron powder to wet treatment in a pot of a ball mill containing a liquid medium; washing the wet treated iron powder with an alcohol wherein the washing of the wet treated iron powder takes place in a washing apparatus having filtration and pressing functions; and drying the washed iron powder at a temperature of 30° C. or lower to obtain iron particles, wherein the iron powder is selected from the group consisting of reduced iron powder, electrolytic iron powder, and atomized iron powder.

2. A method for producing a decomposer for an organohalogen compound, the decomposer containing iron particles consisting of iron and iron oxide, wherein the iron particles have a value of 15% or more by mass as a metallic iron content in the outermost surface layer of the iron particles when ion beam etching has been applied to the iron particles twice under the following etching conditions:

degree of vacuum in a chamber: $2.0 \times 10^{-2}$ Pa accelerating voltage of an ion gun: 10 kV emission current: 10 mA etching time: 14 seconds, wherein the iron particles have average diameter of 100 μm or more, the method comprising the steps of: subjecting raw material iron powder to wet treatment in a pot of a ball mill containing a liquid medium; washing the wet treated iron powder with an alcohol wherein the washing of the wet treated iron powder takes place in a washing apparatus having filtration and pressing functions; and drying the washed iron powder at a temperature of 30° C. or lower to obtain iron particles in a flattened shape having a plate ratio of 5 or more, wherein the iron powder is selected from the group consisting of reduced iron powder, electrolytic iron powder, and atomized iron powder.

3. A method according to claim 1, wherein the alcohol is selected from the group consisting of methanol, ethanol, isopropyl alcohol and combinations thereof.

4. A method according to claim 2, wherein the alcohol is selected from the group consisting of methanol, ethanol, isopropyl alcohol and combinations thereof.

5. A method according to claim 1, wherein the drying the washed iron powder comprises drying the washed iron powder at a temperature of 15° C. or lower.

6. A method according to claim 2, wherein the drying the washed iron powder comprises drying the washed iron powder at a temperature of 15° C. or lower.

* * * * *